March 30, 1965 M. STRANAK 3,175,765
HOT AND COLD WATER MIXING VALVE
Filed Sept. 27, 1963 2 Sheets-Sheet 1
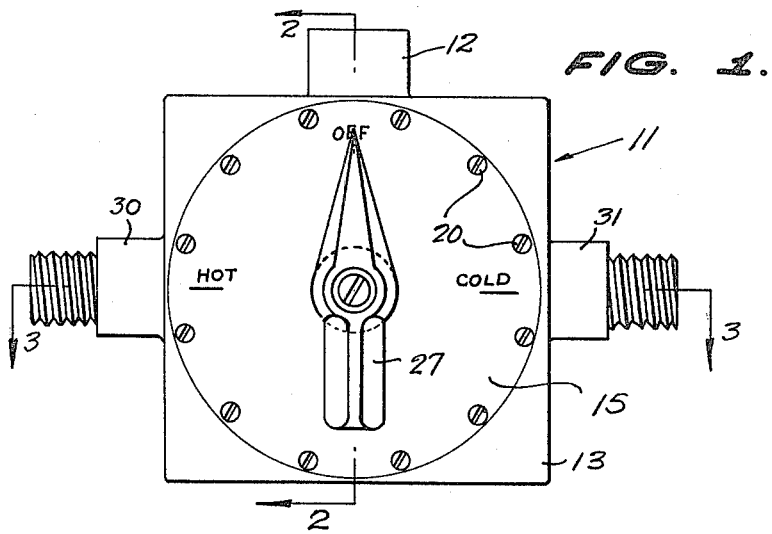
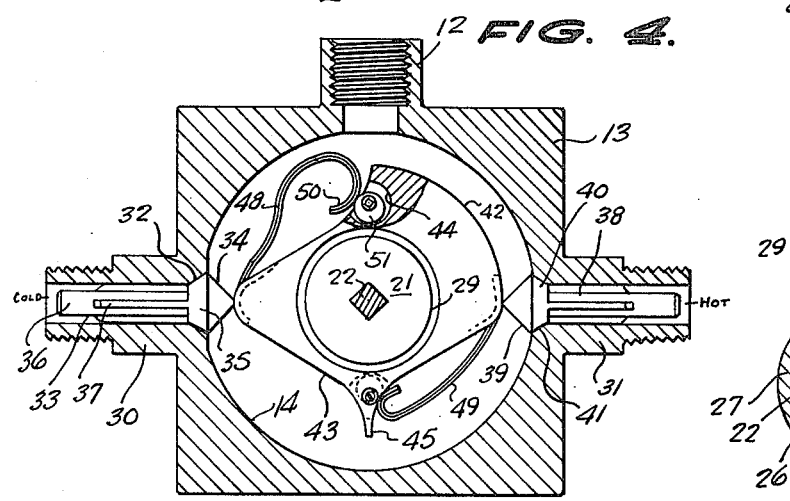
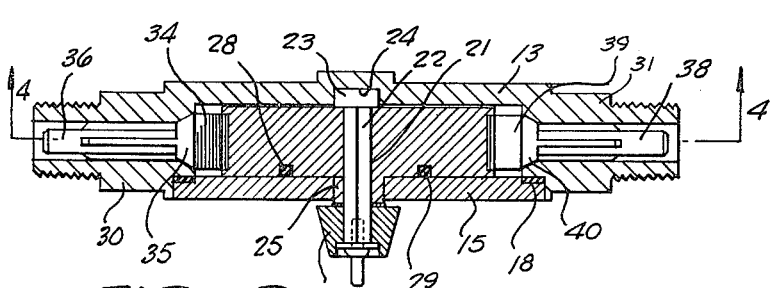
INVENTOR.
MICHAEL STRANAK,
BY
McMorrow, Berman & Davidson
ATTORNEYS.

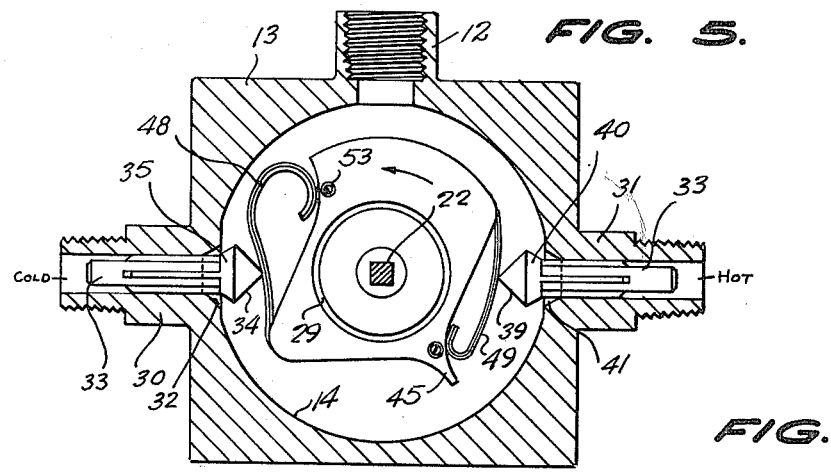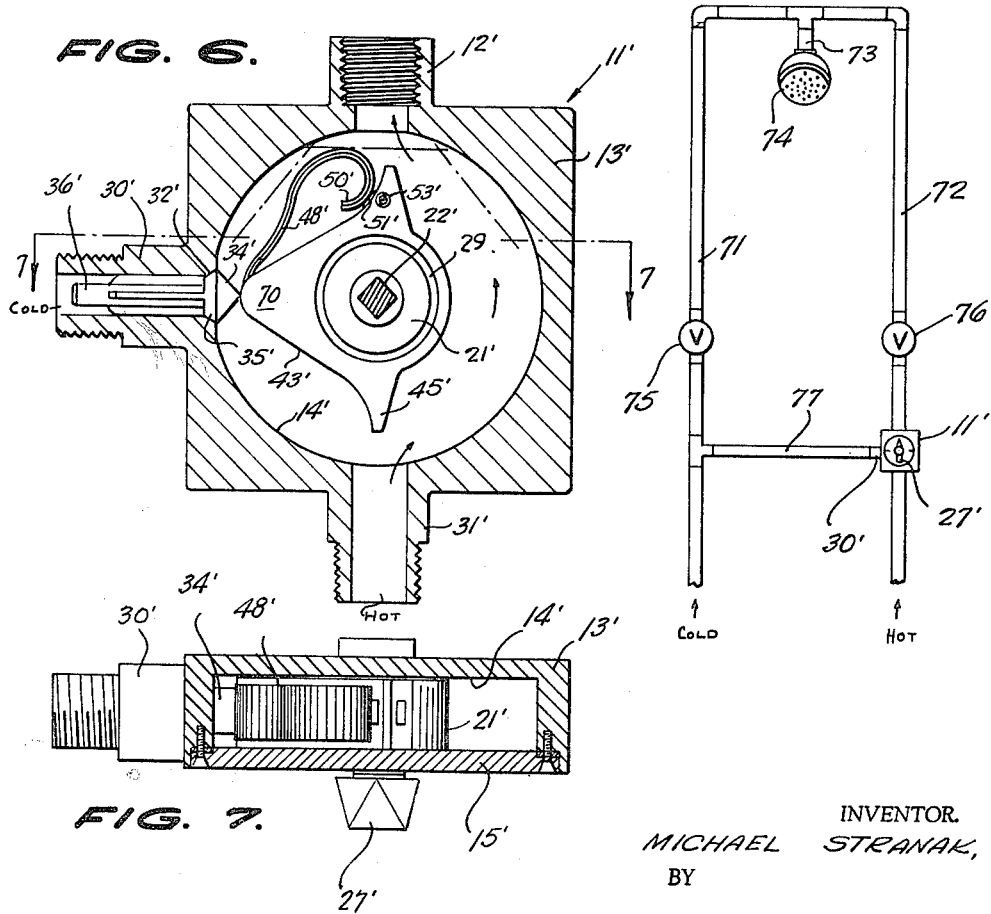

United States Patent Office 3,175,765
Patented Mar. 30, 1965

3,175,765
HOT AND COLD WATER MIXING VALVE
Michael Stranak, 508 S. 7th St., Murray, Ky.
Filed Sept. 27, 1963, Ser. No. 312,075
9 Claims. (Cl. 236—12)

This invention relates to temperature regulating valves, and more particularly to a hot and cold water mixing valve including thermostatic regulating means to provide a desired predetermined hot water temperature in the outlet of the valve.

A main object of the invention is to provide a novel and improved water temperature regulating valve of the type which mixes hot and cold water in a desired proportion to obtain a predetermined desired resultant water temperature, the valve being of relatively simple construction, being easy to manipulate, and providing accurate proportioning of hot and cold water.

A further object of the invention is to provide an improved hot or cold water mixing valve which is inexpensive to fabricate, which is durable in construction, which is easy to adjust, and which can be readily installed by conventional methods.

A still further object of the invention is to provide an improved hot and cold water mixing valve having thermostatic temperature regulating means so as to provide a predetermined water outlet temperature in accordance with a particular setting of the valve, the valve being relatively compact in size, being neat in appearance, and being easy to adjust to provide accurately predetermined water outlet temperatures.

Further objects and advantages of the invention will become apparent from the following description and claims, and from the accompanying drawings, wherein:

FIGURE 1 is a front elevational view of an improved mixing valve constructed in accordance with the present invention.

FIGURE 2 is a vertical cross sectional view taken substantially on the line 2—2 of FIGURE 1.

FIGURE 3 is a horizontal cross sectional view taken substantially on the line 3—3 of FIGURE 1.

FIGURE 4 is a vertical cross sectional view taken substantially on the line 4—4 of FIGURE 3.

FIGURE 5 is a vertical cross sectional view similar to FIGURE 4 but showing the valve in an adjusted position providing mixing of a desired proportion of hot and cold water in the valve to provide a desired resultant outlet temperature.

FIGURE 6 is a vertical cross sectional view similar to FIGURE 4 but showing a modified form of mixing valve constructed in accordance with the present invention.

FIGURE 7 is a horizontal cross sectional view taken substantially on the line 7—7 of FIGURE 6.

FIGURE 8 is a piping diagram showing the valves of FIGURES 6 and 7 connected in a water mixing system leading to a shower head.

Referring to the drawings, and more particularly to FIGURES 1 to 5, 11 generally designates an improved water mixing valve constructed in accordance with the present invention, adapted to provide a desired predetermined water outlet temperature in a conduit connected to the outlet 12 of the valve. The valve 11 comprises a generally rectangular main housing 13 having a substantially circular inner cavity 14 and provided with a circular front cover 15 which is sealingly secured in a countersunk seat 17 provided in the front wall of housing 13 and which bears sealingly against an annular resilient deformable sealing gasket 18 interposed between the marginal portion of the circular cover 15 and the annular seat 17. The cover 15 is secured to the seat 17 by a plurality of uniformly spaced fastening screws 20 extending through the marginal portion of the cover 15 and threadedly engaged in the seat 17.

Designated at 21 is a rotary cam which is non-rotatably mounted on a squared shaft 22 extending axially through the cavity 14 and having a cylindrically shaped head portion 23 rotatably supported in a cylindrical recess 24 formed in the rear wall of housing 13. The shaft 22 extends through a reduced annular portion 25 of the cam 21, said annular portion being rotatably supported in a circular central aperture 26 provided in the cover 15. Rigidly secured to the outer end of the shaft 22 is a pointer knob 27 which extends adjacent to and is rotatable relative to the circular front wall 15.

The front surface of the cam 21 is formed with an annular groove 28 coaxial with the shaft 22, and seated in said groove 28 is a resilient deformable annular sealing ring 29 which sealingly engages against the inside surface of the cover 15.

As shown in FIGURES 1 and 4, the top wall of the housing 13 is formed integrally with the outlet conduit element 12 which is internally threaded to receive the end of a suitable outlet pipe leading to a sprinkler head or other device to be supplied with water at a desired temperature. The opposite sides of the housing 13 are integrally formed with the respective additional conduit portions 30 and 31 adapted to be connected respectively to cold and hot water inlet pipes. The inner end of the cold water inlet conduit 30 is formed with a tapered valve seat 32, and slidably mounted in the conduit element 30 is a valve element 33 having an inner head portion 34 provided with a tapered valve surface 35 sealingly engageable against the seat 32. As shown in FIGURES 3 and 4, the valve element 33 has an elongated shank 36 formed with the longitudinally extending supporting vanes 37 for supporting the valve element in the bore of the conduit element 30 for longitudinal sliding movement. The pressure of the water in the cold water supply pipe connected to the conduit element 30 acts against the head 34, tending to move the valve element 33 inwardly toward unsealing position. As will be presently explained, the inward movement of the valve element 33 is limited by its engagment with the peripheral portion of the cam 21.

Similarly, the hot water inlet conduit element 31 is provided with an inwardly movable valve element 38 having a head portion 39 engageable against the peripheral portion of the cam 21, the head portion 39 being formed with a tapered sealing portion 40 which is sealingly engageable against a tapered seat 41 formed at the inner end of the bore of conduit element 31. The valve member 38 is of similar construction to the valve member 33, being slidably and non-rotatably supported in the bore of the conduit portion 31 and being movable inwardly by the pressure of the water in the hot water supply pipe connected to the conduit portion 31. The inward movement of the valve element 38 is limited by its engagement with cam 21, as previously mentioned.

Cam 21 is provided with the arcuate peripheral portion 42 concentric with shaft 22 and engageable with the valve head member 39 responsive to clockwise rotation of knob 27, from the position shown in FIGURE 4, whereby to hold the hot water conduit 31 sealed during rotation of the control knob 27 clockwise from the position of FIGURE 1 through an angle of approximately 90°. Cam 21 is formed opposite to the arcuate peripheral portion 42 with the sloping peripheral portion 43 against which the valve head element 34 is engageable during the aforesaid clockwise rotation of knob 27, the sloping peripheral portion 43 allowing the valve element 33 to open inwardly as the knob 27 is rotated clockwise from the "off" position shown in FIGURE 1 toward the "cold" position.

The cam 21 is limited to approximately 90° of clockwise rotation by the engagement of the cam head 34 with a lug element 45 formed on the cam 21 at the end of the sloping peripheral portion 43 thereof. Thus, by rotating the knob 27 in a clockwise direction from the position of FIGURE 1, only cold water will be admitted into the cavity 14 and will be allowed to flow therefrom into the outlet conduit element 12.

It will be noted that in the closed position of the valve, shown in FIGURES 1, 2 and 3, both of the valve head elements 34 and 39 are held closed by engagement with the maximum radius peripheral portion of the cam 21. As previously mentioned, when the knob 27 is rotated clockwise from the position of FIGURE 1, the hot water valve 38 is held in closed position, whereas the cold water valve 33 is allowed to open.

Secured circumferentially to the peripheral portions of the valve 21 engaged respectively by the valve head elements 34 and 39 when the valve is in its closed position are respective bimetal temperature-responsive leaf springs 48 and 49 which extend from their secured ends in clockwise directions, as viewed in FIGURE 4, the bimetal leaf spring 48 being provided with an inwardly curved free end portion 50 which engages against an eccentrically mounted rotatable adjusting disc 51 provided in a recess 52 formed in cam 21. The adjusting disc 51 is rigidly mounted on a rotatable adjusting bolt 53 extending through the cam 21 parallel to shaft 22 and being manually adjustable so as to rotate the disc 51 to its desired position of outward extension, thereby varying the amount of outward extension and pre-tension of the bimetal leaf spring 48. The leaf spring 48 has a cam-like curvature so that it regulates the opening of the valve element 33 in accordance with the degree of rotation of the cam 21 in a counterclockwise direction from the position shown in FIGURE 4, and because of its temperature-sensitive characteristics, the amount of opening of the valve element 33 is also determined by the temperature of the water in the cavity 14. The amount of opening of the valve element 33 can be further adjusted in accordance with a desired calibration of the valve by manually adjusting the cam 51 by means of the rotatable cam-adjusting shaft 53.

The bimetal leaf spring 49, opposite the above-described leaf spring 48, is generally similar to leaf spring 48 except that it has a relatively smooth arcuate curvature, as shown in FIGURE 4, permitting a more gradual opening movement of the valve element 38 as the cam 21 is rotated in a counterclockwise direction, the degree of such opening movement being adjustable by means of a calibrating eccentric cam 60 provided in a recess 61 adjacent lug 45, and its pre-tensioning being adjustable in the same manner as the cam 51. The bimetal leaf spring 49 is temperature-responsive, and regulates the amount of opening of the valve element 38 in accordance with the temperature of the water in the cavity 14, cooperating with the bimetal leaf spring 48 to establish a predetermined proportioning of hot and cold water in the cavity portion at any particular setting of the knob 27, whereby to provide a precisely predetermined water temperature in the outlet conduit element 12 for each setting of the knob.

As shown in FIGURE 5, when the knob 27 and the shaft 22 are rotated in a counterclockwise direction from the position of FIGURES 1 to 4, the valve elements 33 and 38 are allowed to move inwardly toward open positions by amounts determined by the contours of the leaf springs 48 and 49, which themselves are temperature-responsive, whereby a desired proportion of hot and cold water is admitted into the cavity 14, to establish a predetermined desired outlet temperature. It will be seen that by the provision of the bimetal temperature-responsive leaf spring elements 48 and 49, the desired outlet temperature can be obtained in spite of variations in temperature of the water supplied respectively to the cold and hot water inlet conduit elements 30 and 31. The operation of the valve is therefore substantially independent of variations in the temperatures of the cold and hot water supply sources. The valve can be calibrated to provide accurate response by adjusting the respective eccentrically mounted cylindrical cam elements 51 and 60.

When the knob 27 is rotated through a relatively small angle counterclockwise from the position of FIGURE 1, for example, through an angle of between 0° and 45°, valve head element 34 is urged against a portion of bimetal spring 48 of considerably diminished radius relative to shaft 22, permitting a large proportion of cold water to enter cavity 14. Valve element 39 is urged against a portion of bimetal spring 49 of only slightly diminished radius relative to shaft 22, so that a relatively small proportion of hot water enters cavity 14. This condition is illustrated in FIGURE 5. The hot and cold water mix together in cavity 14, and the springs 48 and 49 respond to the temperature of the resultant mixture. Since this resultant temperature depends on the initial hot and cold water supply temperatures, it must be corrected to provide a desired calibration value corresponding to the position of knob 27. If the resultant temperature is below said desired calibration value, spring 48 flexes outwardly, namely in a direction to reduce the cold water input, and spring 49 flexes inwardly, namely, in a direction to increase the hot water input. The reverse occurs if the resultant temperature is above the desired calibration value.

When the knob 27 is rotated substantially beyond 45° counterclockwise from the position of FIGURE 1, for example, through an angle greater than 45° and approaching 90°, valve head element 34 engages against a portion of spring 48 of relatively large radius relative to shaft 22, nearly closing off the cold water supply, whereas valve element 39 engages against a portion of spring 49 of still further diminished radius, as compared with the portion engaged in FIGURE 5, allowing more hot water to enter cavity 14. The bimetal springs 48 and 49 again respond to the temperature of the resultant mixture to correct the positions of the valve elements so as to obtain the desired calibration temperature corresponding to the position of pointer knob 27.

Spring 48 is contoured to completely close valve element 33 at the full 90° counterclockwise rotated position of knob 27, and spring 49 is contoured to allow valve element 38 to open to its maximum extent in this position of the knob, providing an output temperature which is the same as that of the hot water supply.

Referring now to FIGURES 6, 7 and 8, a somewhat simplified form of mixing valve according to the present invention is illustrated. The mixing valve is designated generally at 11' and comprises the substantially rectangular main housing portion 13' having the circular front cover 15', similar to the structure of the assembly of FIGURES 1 to 5. The housing body 13' is integrally formed with the outlet conduit portion 12' and with the respective cold and hot water inlet conduit portions 30' and 31', the hot water inlet conduit portion 31' being located directly opposite the outlet conduit portion 12', and the cold water inlet conduit portion 30' being formed in the side of the housing 13' between the top and bottom conduit portion 12' and 31', as viewed in FIGURE 6. Slidably mounted in the cold water inlet conduit portion is a valve element 36' similar to the valve element 36 in the previously described form of the invention, and provided with the sealing portion 35' engageable against the valve seat 32' formed at the inner end of conduit portion 30'. The head portion of the valve element 36' comprises a tapered member 34' which is engageable against a rotatable cam 21' axially mounted in the cavity 14' of housing 13'. Cam 21' is non-rotatably mounted on the rotatable squared shaft 22' which is externally provided with the operating knob 27. Free flow of hot water from an external supply is allowed through the conduit element 31'. The supply of cold water from the conduit element 30' is regulated by the cooperative action of valve head 34' and cam 21'. Thus, the cam 21' has a sloping peripheral portion 43' which is engageable by the head 34' as the cam 21' is rotated in a clockwise direction, as viewed in FIGURE 6, allowing the valve 36' to open inwardly and to allow cold water to enter the cavity 14' in accordance with the degree of rotation of knob 27' in a clockwise direction from the position of FIGURES 6 and 7. Such rotation is limited to approximately 90° by the provision of a stop lug 45' formed on the cam 21' at the end of the sloping peripheral portion 43', as shown in FIGURE 6.

Secured to the maximum-radius cam portion 70 and extending in a clockwise direction therefrom, as viewed in FIGURE 6, is a bimetal leaf spring 48', generally similar to the bimetal leaf spring 48 in the previously described form of the invention, and having inwardly curved free end portions 50' whose normal position and pretension is adjustable, by means of an adjusting cam element 51', whose rotated position is controlled by an adjusting screw 53'. The bimetal leaf spring 48' is formed with a smoothly undulating contour, as in the case of the spring 48, so that when the cam 21' is rotated in a counterclockwise direction from the position of FIGURE 6, the head 34' is allowed to move inwardly to admit cold water to a degree in accordance with the amount of rotation of the cam 21', and also in accordance with the temperature of the water in the cavity 14'. Thus, when the knob 27' is rotated in a counterclockwise direction from the position of FIGURE 7, the amount of cold water admitted into the cavity 14' is regulated in accordance with the undulating curvature of the leaf spring 48', and also in accordance with the temperature of the mixture of hot and cold water in cavity 14', so that the degree of opening of the cold water inlet conduit 30' is controlled in accordance with the temperature of the resultant mixture. The proportion of cold water included in the mixture is thus regulated by the degree of rotation in a counterclockwise direction of the cam 21', and by the response of the bimetal leaf spring 48.

The simplified valve assembly of FIGURES 6 and 7 may be employed in a typical piping system such as that shown in FIGURE 8, wherein the mixture of water from a cold water supply pipe 71 and a hot and cold water mixture from a supply pipe 72 is admitted to a conduit 73 leading to a sprinkler head 74. The respective pipes 71 and 72 are provided with conventional manually operated control valves 75 and 76. The mixing valve 11' is installed in the supply pipe 72 below the manually operated valve 76 and its cold water inlet conduit portion 30' is connected by a cross conduit 77 to the cold water pipe 71. Thus, cold water is admitted simultaneously to the pipes 71 and 77, so that the sprinkler head 74 is supplied with cold water from the pipe 71 through the valve 75. A mixture of hot and cold water is supplied to the pipe 72 from the mixing valve 11', the temperature of the mixture being determined by the setting of the adjusting knob 27'. By adjusting the knob 27' to its maximum counterclockwise adjusted position, the cross conduit 77 may be sealed off with respect to the pipe 72 and only hot water will be furnished to said pipe 72. If so desired, the cold water can be cut off by closing the valve 75, and the valve 76 may be opened, allowing only hot water to reach the sprinkler head 74. Any desired temperature of the water furnished to the sprinkler head 74 may be achieved by suitably adjusting the mixing valve 11', with valve 75 closed and valve 76 opened.

While certain specific embodiments of a hot and cold water mixing valve have been disclosed in the foregoing description, it will be understood that various modifications within the spirit of the invention may occur to those skilled in the art. Therefore, it is intended that no limitations be placed on the invention except as defined by the scope of the appended claims.

What is claimed is:
1. In a mixing valve, a housing having an outlet conduit and respective cold and hot water inlet ports, respective valve elements movably mounted in said ports and being movable in the housing to open said ports, a rotatable mixture-adjusting cam mounted in said housing and having respective peripheral surface portions engageable with said valve elements to limit their opening movements, and a temperature responsive contact element secured circumferentially on at least one of said peripheral surface portions and limiting the opening movement of the associated valve element in accordance with the temperature of the water in said housing.

2. In a mixing valve, a housing having an outlet conduit and respective cold and hot water inlet ports, respective valve elements movably mounted in said ports and being movable in the housing to open said ports, a rotatable mixture-adjusting cam mounted in said housing and having respective peripheral surface portions engageable with said valve elements to limit their movements, a temperature-responsive contact spring flexibly secured on at least one of said peripheral surface portions and engaging with and limiting the opening movement of the associated valve element in accordance with the temperature of the water in said housing, and an adjusting eccentric auxiliary cam mounted on the first-named cam and engaging a free portion of the spring.

3. In a mixing valve, a housing having an outlet conduit and respective cold and hot water inlet ports, respective valve elements movably mounted in said ports and being movable in the housing to open said ports, a rotatable mixture-adjusting cam mounted in said housing and having respective peripheral surface portions engageable with said valve elements to limit their movements, and a circumferentially extending temperature-responsive bimetal leaf spring secured at one end on at least one of said peripheral surface portions and engaging with and limiting the opening movement of the associated valve element in accordance with the temperature of the water in said housing.

4. In a mixing valve, a housing having an outlet conduit and respective cold and hot water inlet ports, respective valve elements movably mounted in said ports and being movable in the housing to open said ports, a rotatable mixture-adjusting cam mounted in said housing and having respective peripheral surface portions engageable with said valve elements to limit their movements, a temperature-responsive bimetal leaf spring secured at one end on at least one of said peripheral surface portions and engaging with and limiting the opening movement of the associated valve element in accordance with the temperature of the water in said housing, and a circular adjusting cam eccentrically mounted on the first named cam and underlying a free portion of the spring.

5. In a mixing valve, a housing having a water outlet conduit and respective hot and cold water inlet ports, a valve element movably mounted in at least one of said inlet ports and being movable to open same, a rotatable mixture-adjusting cam mounted in said housing and having a peripheral surface portion extending adjacent said valve element, and a circumferentially extending temperature-responsive leaf spring secured at one end to and extending along said peripheral surface portion and being engageable by said valve element to adjustably limit the opening movement of the valve element in accordance with the rotated position of the cam and in accordance with the temperature of the water in said housing.

6. In a mixing valve, a housing having a water outlet conduit and respective hot and cold water inlet ports, a valve element movably mounted in at least one of said inlet ports and being movable to open same, a rotatable mixture-adjusting cam mounted in said housing and having a peripheral surface portion extending adjacent said valve element, and a circumferentially extending temperature-responsive bimetal leaf spring secured to and extending along said peripheral surface portion and being engageable by said valve element to adjustably limit the opening movement of the valve element in accordance with the rotated position of the cam and in accordance with the temperature of the water in said housing.

7. In a mixing valve, a housing having a water outlet conduit and respective hot and cold water inlet ports, a valve element movably mounted in at least one of said inlet ports and being movable to open same, a rotatable mixture-adjusting cam mounted in said housing and having a peripheral surface portion extending adjacent said valve element, a temperature-responsive bimetal leaf spring secured at one end to and extending along said peripheral surface portion and being engageable by said valve element to adjustably limit the opening movement of the valve element in accordance with the rotated position of the cam and in accordance with the temperature of the water in said housing, and an adjusting disc rotatably and eccentrically mounted on the cam and underlying the free end portion of the leaf spring to adjust the degree of outward extension of the leaf spring with respect to the cam.

8. In a mixing valve, a housing having a water outlet conduit and oppositely located hot and cold water inlet ports, respective valve elements movably mounted in said inlet ports and being movable to open same, a rotatable mixture-adjusting cam mounted in said housing between the ports, said cam having fixed peripheral portions engageable with the valve elements to limit their opening movements independently of the water temperature in the housing in one direction of rotation of the cam from a predetermined starting position, and bimetal leaf springs secured circumferentially on the cam and being engageable with the valve elements to limit their opening movements in accordance with the water temperature in the housing in the opposite direction of rotation of the cam from said predetermined starting position.

9. In a mixing valve, a housing having a water outlet conduit and oppositely located hot and cold water inlet ports, respective valve elements movably mounted in said inlet ports and being movable to open same, a rotatable mixture-adjusting cam mounted in said housing between the ports, said cam having fixed peripheral portions engageable with the valve elements to limit their opening movements independently of the water temperature in the housing in one direction of rotation of the cam from a predetermined starting position, and bimetal leaf springs secured circumferentially on the cam and being engageable with the valve elements to limit their opening movements in accordance with the water temperature in the housing in the opposite direction of rotation of the cam from said predetermined starting position, the periphery of said cam being formed to hold said valve elements in full sealing positions in said inlet ports in said starting position of the cam and to allow said valve elements to move to opening position responsive to rotation of the cam in said opposite direction from said starting position.

References Cited by the Examiner
UNITED STATES PATENTS

| | | | |
|---|---|---|---|
| 1,371,795 | 3/21 | Logan. | |
| 1,984,892 | 12/34 | Phillips et al. | 236—12 |
| 2,553,027 | 5/51 | Wianco | 236—12 |
| 2,839,247 | 6/58 | Jorgensen | 236—12 |

EDWARD J. MICHAEL, *Primary Examiner.*
ALDEN D. STEWART, *Examiner.*